US008612890B2

(12) United States Patent
Nijlunsing et al.

(10) Patent No.: US 8,612,890 B2
(45) Date of Patent: Dec. 17, 2013

(54) LABELING A SEGMENTED OBJECT

(75) Inventors: Rutger Nijlunsing, Eindhoven (NL); Raymond Joseph Elisabeth Habets, Eindhoven (NL)

(73) Assignee: Koninklijke Philips N.V., Eindhoven (NL)

(*) Notice: Subject to any disclaimer, the term of this patent is extended or adjusted under 35 U.S.C. 154(b) by 616 days.

(21) Appl. No.: 12/746,937

(22) PCT Filed: Dec. 9, 2008

(86) PCT No.: PCT/IB2008/055154
§ 371 (c)(1),
(2), (4) Date: Jun. 9, 2010

(87) PCT Pub. No.: WO2009/077916
PCT Pub. Date: Jun. 25, 2009

(65) Prior Publication Data
US 2010/0275145 A1    Oct. 28, 2010

(30) Foreign Application Priority Data

Dec. 14, 2007   (EP) .................................. 07123205

(51) Int. Cl.
*G06F 3/048*   (2013.01)
*G06F 17/00*   (2006.01)
*G06K 9/18*   (2006.01)

(52) U.S. Cl.
USPC ............ 715/811; 715/231; 715/769; 382/128

(58) Field of Classification Search
USPC ................. 715/769, 231–232, 771, 811, 853; 382/128, 180
See application file for complete search history.

(56) References Cited

U.S. PATENT DOCUMENTS

| 6,301,579 | B1* | 10/2001 | Becker ................................. 1/1 |
| 7,158,692 | B2* | 1/2007 | Chalana et al. ............... 382/294 |
| 7,643,662 | B2* | 1/2010 | Gering .......................... 382/128 |
| 8,346,483 | B2* | 1/2013 | Kil ................................. 702/19 |
| 2004/0216149 | A1 | 10/2004 | Reitz et al. |
| 2005/0163375 | A1* | 7/2005 | Grady ........................... 382/180 |
| 2005/0232055 | A1 | 10/2005 | Couckuyt et al. |
| 2005/0248560 | A1* | 11/2005 | Agrawala et al. ............ 345/418 |
| 2006/0061595 | A1 | 3/2006 | Goede et al. |
| 2007/0276214 | A1* | 11/2007 | Dachille et al. ............... 600/407 |
| 2008/0292194 | A1* | 11/2008 | Schmidt et al. ............... 382/217 |
| 2009/0220171 | A1* | 9/2009 | Liu et al. ....................... 382/282 |
| 2010/0260396 | A1* | 10/2010 | Brandt et al. ................. 382/131 |

OTHER PUBLICATIONS

Huang et al: "IVME: A Tool for Editing, Manipulation, Quanitification, and Labeling of Cerebrovascular Models"; Computerized Medical Imaging and Graphics, Vol. 30, No. 3 (2006), pp. 187-195.
Nowinski et al: "Informatics in Radiology (infoRAD): Three-Dimensional Atlas of the Brain Anatomy and Vasculature"; Radiographics, 2005, vol. 25, Jan. 2005, pp. 263-271.

(Continued)

*Primary Examiner* — Omar Abdul-Ali
*Assistant Examiner* — Andrew Tank

(57) ABSTRACT

The present invention has the advantage over the prior art that it provides a labeling method suitable for a complete medical report. In an aspect the present invention provides intuitive visual manual labeling, easy navigation based on anatomy, feedback to improve segmentation interactively, and automatic labeling based on anatomical textbook knowledge and already provided manual labels.

15 Claims, 3 Drawing Sheets

Nomenclature of Bronchi
Schema

(56) References Cited

OTHER PUBLICATIONS

Shneiderman et al: "Direct Annotation: A Drag-and-Drop Strategy Labeling Photos"; IEEE Conference on Information Visualization, 2000, pp. 88-95.

Caelli et al: "A Trainable Image Annotation System"; Pattern Recognition Letters, vol. 18 (1997), pp. 1247-1252.

Chan et al: "An Automatic Annotation Tool for Virtual Anatomy"; Proceedings of the 2007 IEEE International Conference on Integration Technology; Mar. 2007, pp. 269-274.

Mori et al: "Automated Anatomical Labeling of the Bronchial Branch and Its Application to the Virtual Bronchoscopy System"; IEEE Transactions on Medical Imaging, vol. 19, No. 2, Feb. 2000, pp. 103-115.

* cited by examiner

LABELING A SEGMENTED OBJECT

FIELD OF THE INVENTION

This invention pertains in general to the field of segmentation and modeling of anatomical tree-like structures. More particularly, the invention pertains to drag and drop tree labeling & navigation.

BACKGROUND OF THE INVENTION

Labeling, i.e. matching anatomical textbook information to a segmented object, is crucial for a complete medical report but is often performed manually in an ad-hoc manner due to time constraints, or automatically, in which case labeling often fails when presented with non-standard anatomy or bad or uncommon scans.

Current image processing workstations and Picture Archiving and Communication Systems (PACS) offer all kinds of segmentation tools for tree-like structures, such as vessels. These segmentation tools utilize techniques such as region growers, include and exclude seed strategies, thresholds, and statistical or model-based learning. Besides the segmentation tools and methods, there have been some attempts towards automatic labeling based on anatomical reference models, such as atlases.

FIG. 1 illustrates an example of combined tree segmentation and an atlas of the bronchial tree. The left portion of FIG. 1 shows a segmentation of the bronchial tree. The right portion of FIG. 1 shows an atlas with the nomenclature of the bronchial airway tree.

Currently, even when the segmentation tool is working adequately, the labeling task will be difficult because the diversity in "normal anatomical" structures can be very large. In case of missing tree segments, which will be the case in the analysis of trees with obstructions, it is even harder to perform automatic labeling. Automatic labeling also requires that the segmented tree structure is presented in an "anatomical" way. Segmentation tools often provide small branches in a standard graph-like structure. Anatomically there will be a main branch and several sub branches that originate from that main branch. A label or anatomical name belongs to a main branch that may consist of several branching levels in the detected graph.

Current solutions are either ad-hoc or automatic. In ad hoc solutions, not all is labeled but only two or three places are labeled since labeling takes time, and the user often has limited time for these tasks. This means for example that the segmenting is performed only near a stenotic region instead of being applied to a whole vessel, after which manual labeling of the small region is performed.

In some current manual labeling techniques a path found by a segmentation tool may be selected and a name may be assigned from a list. Once selected, the name disappears from the list.

Automatic labeling will often fail in non-standard anatomy and/or bad or uncommon scans, in which case an easy correction is not offered.

Hence, an improved labeling method, apparatus, graphical user interface, computer-readable medium, and use would be advantageous, allowing for increased flexibility, and cost-effectiveness.

SUMMARY OF THE INVENTION

Accordingly, the present invention preferably seeks to mitigate, alleviate or eliminate one or more of the above-identified deficiencies in the art and disadvantages singly or in any combination, and solves at least the above-mentioned problems by providing a method, apparatus, graphical user interface, computer-readable medium, and use according to the appended patent claims.

In an aspect of the invention, a method of labeling a segmented object comprising image data is provided. The method comprises selecting a label in an image comprising a set of labels, utilizing a pointing device. Moreover, the method comprises selecting a portion of the segmented object at which the label is to be positioned, utilizing the pointing device. Furthermore, the method comprises labeling the portion of the segmented object with the label, resulting in a labeled segmented object.

According to another aspect of the invention, a method of updating an image with a labeled segmented object comprising image data is provided. The method comprises selecting a portion of the labeled segmented object, utilizing a pointing device. Moreover, the method comprises selecting a label in an image comprising a set of labels, utilizing the pointing device. Furthermore, the method comprises updating the label in the image with the portion of the segmented object, resulting in an updated image.

In yet another aspect, an apparatus for labeling a segmented object comprising image data is provided. The apparatus comprises a pointing device configured to select a label in an image comprising a set of labels and to select a portion of the segmented object at which the label is to be positioned. The apparatus further comprises a unit configured to label the portion of the segmented object with the label by utilizing the pointing device to drag the label from the image and drop the label on the portion of the segmented object, resulting in a labeled segmented object.

In another aspect of the invention, a computer-readable medium having embodied thereon a computer program for labeling of a segmented object comprising image data, and for processing by a processor, is provided. The computer program comprises a code segment for selecting a label in an image comprising a set of labels, utilizing a pointing device. Moreover, the computer program comprises a code segment for selecting a portion of a segmented object comprising image data, at which the label is to be positioned, utilizing the pointing device. Furthermore, the computer program comprises a code segment for labeling the portion of the segmented object with the label, resulting in a labeled segmented object.

In another aspect of the invention, a graphical user interface is provided and configured to perform the method according to some embodiments.

In yet another aspect of the invention, a use of the method according to some embodiments is provided for facilitating diagnosing a disease or disorder in a segmented object comprising image data of a patient.

In another aspect, a workstation comprising an apparatus according to some embodiments is provided.

According to some embodiments, an easy manual labeling method is provided, suitable for a complete medical report.

In an aspect, the present invention provides intuitive, visual manual labeling, easy navigation based on anatomy, feedback to improve segmentation interactively, and automatic labeling based on textbook knowledge and the already provided manual labels.

The method according to some embodiments provides assistance for interactive segmentation, re-segmentation and the editing of the segmentation. Furthermore, the method according to some embodiments provides for content aware navigation, meaning easy navigation based on anatomical textbook labels.

BRIEF DESCRIPTION OF THE DRAWINGS

These and other aspects, features and advantages which the invention is capable of will be apparent and elucidated from the following description of embodiments of the present invention, reference being made to the accompanying drawings, in which.

DESCRIPTION OF EMBODIMENTS

Figure 1:
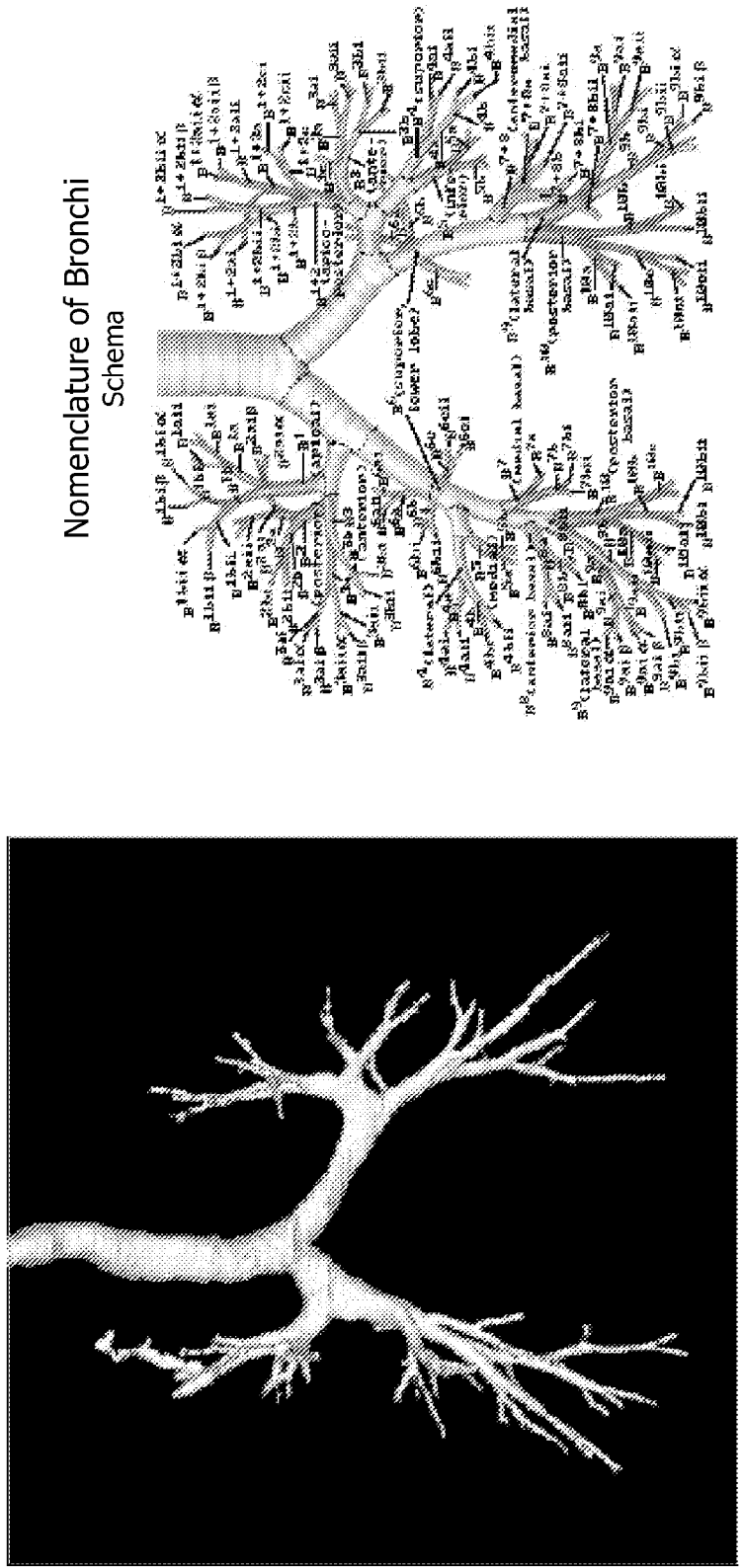
FIG. 1 is an illustration showing an example of combined tree segmentation and an atlas of the bronchial tree.

Several embodiments of the present invention will be described in more detail below with reference to the accompanying drawings in order for those skilled in the art to be able to carry out the invention. The invention may, however, be embodied in many different forms and should not be construed as being limited to the embodiments set forth herein. Rather, these embodiments are provided so that this disclosure will be thorough and complete, and will fully convey the scope of the invention to those skilled in the art. The embodiments do not limit the invention, but the invention is only limited by the appended patent claims. Furthermore, the terminology used in the detailed description of the particular embodiments illustrated in the accompanying drawings is not intended to be limiting the invention.

The following description focuses on embodiments of the present invention applicable to labeling of tree-like anatomical structures comprised in anatomical images, e.g. 2D or 3D patient data images constructed using, for example, X-ray, Computed Tomography, Magnetic Resonance Imaging, or Ultrasound Imaging.

However, it will be appreciated that the invention is not limited to tree-like anatomical structures, but may be applied to any structure on which labeling, i.e. matching anatomical textbook information to a segmented object, is desired.

The main idea of the present invention is to provide a method of labeling a segmented object such as a blood vessel tree. In an embodiment, a user may select a label in an image, drag it to a portion of a segmented object, thereby selecting said portion, and drop the label at said portion. Alternatively, the user may select the label in the image, select the portion of the segmented object, and the system may be arranged to drop the selected label at the selected portion. In an embodiment, the user may select a report template suitable for reporting the findings of the current segmentation & analysis task. These medical reports often contain a "textbook" image of the studied anatomy. An anatomical image may e.g. contain the anatomical names of the anatomical object, such as vessels, in the studied anatomy under consideration. The anatomical names may be defined as labels in the anatomical image. The anatomical image may be used to mark the regions where a stenotic or otherwise abnormal region was found during segmentation. Next to the anatomical image a display may be used to display a rendering of the segmented object, e.g. an anatomical tree-like structure such as a vessel tree. This rendering may be a 3D rendering of the segmented volume, such as a Maximum Intensity Projection (MIP) or volume rendering, or a 3D curved planar MIP or just a 3D graph, e.g. with line representation, of the segmented vessel tree. The only requirement to the segmented tree visualization is that enough anatomical context is visible so that the user may identify the vessels. In the following labeling step, the user may drag a label corresponding to a certain portion of the anatomical image and drop it onto a portion of the segmented object or vice versa. For example, each portion of the segmented object may e.g. define a part of a vessel between two bifurcations.

By dropping a label corresponding to a certain portion of the anatomical image onto a corresponding portion of the segmented object, the entire portion of the segmented object may be labeled. This means that not only the actual drop location in the segmented object will be labeled but also the entire portion, such as vessel part, of the segmented object will be labeled. Accordingly, throughout this specification, by labeling is meant annotating an already segmented portion of the segmented object such that the segmented portion corresponds to an anatomical name, e.g. of a vessel.

An anatomical textbook label may be used for more than one portion, such as a vessel segment, of the segmented object. This may for example be the case when the segmented object comprises abnormalities compared to the anatomical image or in the case that one anatomical structure got segmented into several sub-segments. In this way several portions of the segmented object may correspond to only one label in the anatomical textbook.

Figure 2:
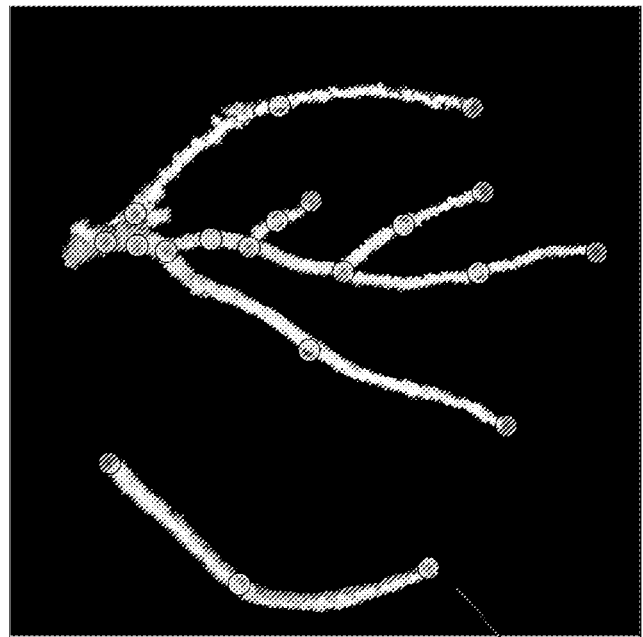
FIG. 2 is an illustration of manual labeling according to an embodiment, utilizing a segmented object and an anatomical textbook.
Figure 2:
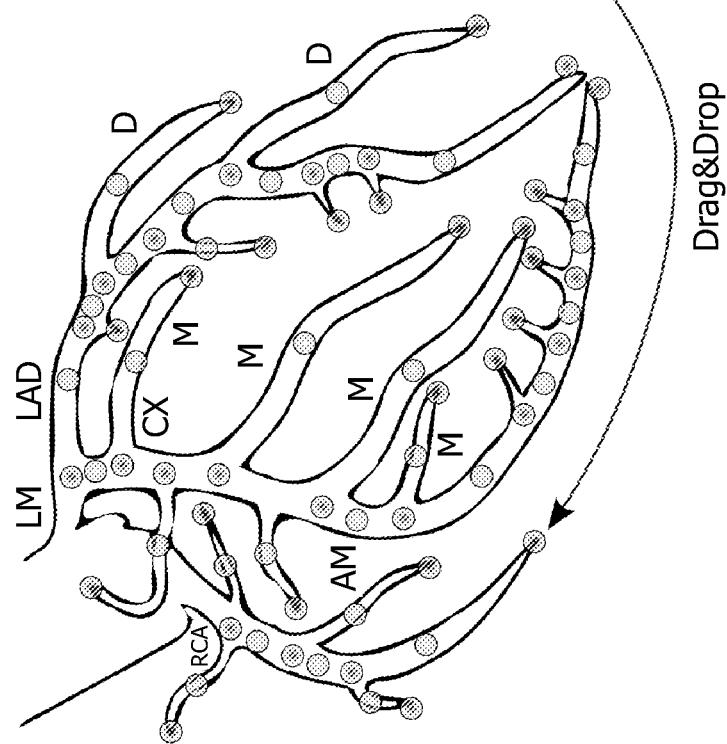

FIG. 2 illustrates a segmented object and an anatomical image, wherein the correspondence between a label in the segmented object and the anatomical image is shown with an arrow. Moreover, FIG. 2 illustrates how, in an embodiment of the method, a portion of the segmented object may be dragged and dropped onto a label of the anatomical textbook in order to manually label the portion of the segmented object.

Throughout this specification the term "image" or "anatomical image" is to be appreciated as reference image such as an image in an anatomical textbook or an image in an anatomical atlas. The anatomical image may be a schematic image. The term "image data" is to be understood as image data of an anatomical structure of a patient, e.g. acquired using Magnetic Resonance Imaging, etc.

Figure 3:
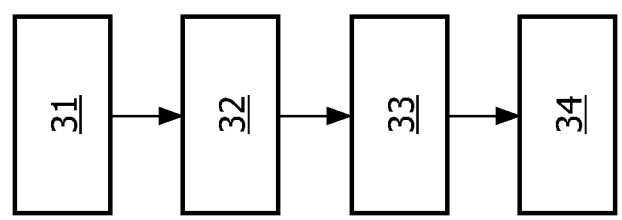
FIG. 3 is a flowchart showing a method according to an embodiment.

In an embodiment, according to FIG. 3, a method of labeling a segmented object displayed in a first window is provided. The method comprises selecting 31 a label in an image comprising a set of labels. The method may also comprise selecting 32 a portion of the segmented object at which the label is to be positioned. Furthermore, the method may comprise labeling 33 the segmented object with the label, resulting in a labeled segmented object.

In an embodiment, selecting a label is performed by clicking the label, using a pointing device, and selecting a location is performed by dragging and dropping the label at the location, using the pointing device. An advantage of the method is that the provided labeled segmented object comprises information that may be used to point out similarities between an anatomical image and a segmented object of an anatomical structure.

Automatic Labeling

An advantage of the method, according to some embodiments, is that it enables automatic labeling of non-labeled landmarks near already labeled landmarks.

In some embodiments, automatic-labeling techniques may be utilized, matching labels of the anatomical textbook to different portions of the segmented object, based on the already manually labeled portions of the segmented object. Accordingly, the automatic labeling process may thus be facilitated utilizing manually entered labels.

The method according to some embodiments is not limited to any particular choice of automatic labeling technique. Rather any known automatic labeling technique could be used as long as the automatic labeling technique is configured to utilize the information of already labeled portions of the segmented object.

Should the automatic-labeling technique result in an erroneous labeling, the user may manually drop the anatomical textbook label(s) onto the affected portion(s) of the segmented object to correct the labeling. Accordingly, as mentioned above, when some of the vessels in the segmented object are manually labeled, an automatic algorithm may assist in adding the rest of the names.

In an embodiment, an automatic-labeling technique may be used for each label of the anatomical image. Accordingly, when a portion of the segmented object has been manually labeled, the automatic-labeling technique may be utilized to optionally label the remaining portions of the segmented object, which also correspond to the same label.

According to an embodiment, the automatic-labeling technique may utilize the fact that a certain label is already manually placed, or dropped, on a certain location in the segmented object to better estimate where the other labels or the same label should be automatically placed in the segmented object.

Re-Segmentation

In an embodiment, the method may further comprise performing re-segmentation of a labeled segmented object, based on the labels of the segmented object. For example, the re-segmentation may utilize knowledge of the already labeled vessels in the segmented object. In a practical example, the left main coronary artery in the segmented object is very short and directly bifurcates in the LAD and the LCX. Should a user already label the left main coronary artery, this information may be utilized during re-segmentation. In this case, the re-segmentation technique may utilize the fact that a split will follow soon and moreover in what directions the child branches will go.

By re-segmentation is meant that at least a part of the original segmentation is re-performed or expanded, e.g. in the event that the original segmentation (partially) failed. Segmentation techniques may fail because of bad image quality or other image artifacts. Vessel segmentation may leak into another structure or it may generate many small vessels in what is actually one bigger vessel due to image noise. If segmentation differs from an image, it may still be right, as the image might not apply for the current case. In such a case it will be up to the user to inspect the original image data and decide on the segmentation quality.

With this approach the labeling becomes part of the segmentation-cycle, which means that the user may delete branches from or add branches to the original segmented objects, or perform the labeling. This provides feedback for the automatic segmentation algorithm, which, given the anatomical textbook, has more knowledge that can be used during the re-segmentation. For example, this may signal that the original segmentation of e.g. the vessels missed some parts. From the anatomical textbook it may be known that a certain vessel should have two child branches, whereas the segmented object only comprises one, e.g. due to the fact that the segmentation could have missed one branch, or that the other branch might be absent, i.e. pertain to a special case, or it might be blocked such as in the case of stenosis. Of course not all additional branches in the originally segmented object will be wrong, as the anatomical images only show the most common situations.

As great anatomical variations do exist, it is also an option that an originally segmented object in fact shows the actual anatomical structure that differs from the anatomical image.

In the case that the textbook shows that there e.g. should be one branch and the originally segmented object shows two, re-segmentation may be used to see whether the original segmentation was wrong. Should the re-segmented object still comprise two branches, it may pertain to a special case, and it will be up to the user to decide whether the re-segmented object is true. In some embodiments the re-segmentation is not automatic, but is under user control.

Drag and Drop Direction

According to some embodiments the drag and drop direction, i.e. from/to the anatomical image to/from the segmented object, will render exactly the same labeling result of the segmented object.

In another embodiment, the user may update the anatomical atlas or textbook, and extend it with a new anatomical representation, such as a special case or abnormality of the same vessel anatomy, based on a portion of the segmented object, which may be dragged-and-dropped into the anatomical atlas or textbook. Accordingly, in this embodiment the drag and drop direction has impact on whether the segmented object is to be labeled or the anatomical image is to be updated with information from the segmented object.

In an embodiment, a method of updating an image with a labeled segmented object is provided. The method comprises selecting 32 a portion of the labeled segmented object, utilizing a pointing device. The method may also comprise selecting 31 a label in an image comprising a set of labels, utilizing the pointing device. Furthermore, the method may comprise updating 33 the label in the image with at least one label of the portion of the segmented object by utilizing the pointing device to drag the portion of the segmented object and drop it on the label in the image, resulting in an updated image.

Navigation

An advantage of the method according to some embodiments is that it yields facilitated visual navigation of an anatomical structure.

Furthermore, the method may comprise presenting 34 the segmented object or labeled segmented object and/or the corresponding anatomical image on a display to further facilitate the user navigation.

The method according to some embodiments results in a labeled segmented object of an anatomical structure. The labeled segmented object may be observed by a user in order to facilitate navigation, for instance when inspecting portions, such as vessels, of the segmented object to see whether any abnormality, such as stenosis, aneurysms or plaque are visible. Inspection is facilitated as the labels in the segmented object, comprising anatomical names, will help the investigation process of the user, as different abnormalities may occur at different locations of the anatomical structure.

The segmented object, labeled segmented object, or re-segmented object may be a 2D object or a 3D object, suitable for 2D representation or 3D representation.

An advantage of the method according to some embodiments is that it supports easy navigation within the labeled segmented object and the anatomical image since labeling is actually a registration task between an anatomical image and a segmentation result. Thus, this navigation may be supported by using both the anatomical image and one or more 2D and/or 3D representations of the labeled segmented object.

Navigation may be facilitated when the segmented object is labeled, as the user then knows what to expect at a certain location of the labeled segmented object.

In an embodiment, the method comprises visualizing the labeled segmented object and the corresponding anatomical image on a display. The method may also comprise linking the labels of the labeled segmented object to the corresponding labels in the anatomical image. By linking is meant that when a label in the labeled segmented object is selected, e.g. utilizing a pointing device, the corresponding label of the anatomical image is highlighted, and vice versa.

Accordingly, by clicking in the image the corresponding anatomical location in the segmented object may be highlighted. Conversely, by clicking somewhere in the labeled segmented object the corresponding textbook location may be highlighted. This feature is useful in marking findings like obstructions, stenosis etc.

By highlighting is meant that the visual appearance of the label in the labeled segmented object or in the anatomical image is changed, e.g. by changed brightness, contrast, or color etc., when the corresponding label in the image or in the respective labeled segmented object is selected utilizing the pointing device.

In some embodiments, the resulting labeled segmented object may be used for a rich, structured report containing the whole vessel tree instead of a small portion of the tree, as the assigned label helps to search the labeled segmented data afterwards.

Apparatus

Figure 4:
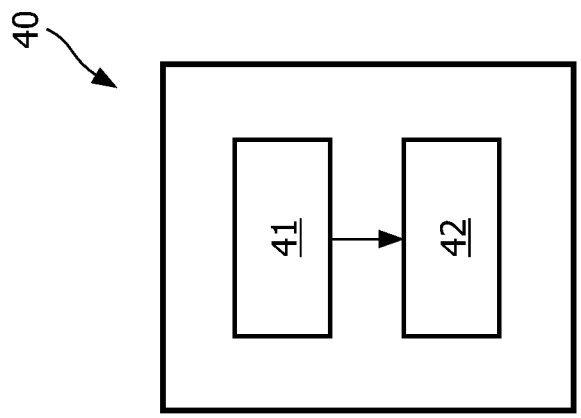
FIG. 4 is a block diagram of an apparatus according to an embodiment.

In an embodiment, according to FIG. 4, an apparatus 40 for labeling a segmented object is provided. The apparatus comprises a pointing device 41 configured to select a label in an image comprising a set of labels. Moreover, the pointing device may be configured to select a portion of the segmented object at which the label is to be positioned. Furthermore, the apparatus may comprise a unit 42 for labeling the segmented object by utilizing the pointing device to drag the label from the image and drop the label on the portion of the segmented object, resulting in a labeled segmented object.

The unit(s) of the apparatus may be any unit(s) normally used for performing the involved tasks, e.g. a hardware unit, such as a processor with a memory.

In an embodiment, the apparatus comprises units for performing the method according to one or more embodiments.

In an embodiment, the apparatus is comprised in a medical workstation or medical system, such as a Computed Tomography (CT) system, Magnetic Resonance Imaging (MRI) System or Ultrasound Imaging (US) system.

Computer-Readable Medium

Figure 5:
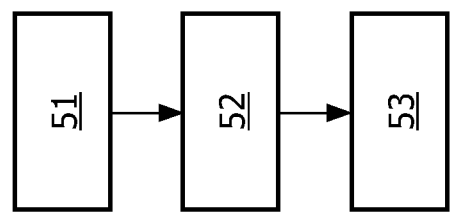
FIG. 5 is a block diagram of a computer program according to an embodiment.

In an embodiment, according to FIG. 5, a computer-readable medium is provided having embodied thereon a computer program for processing by a processor. The computer program comprises a code segment 51 for selecting a label in an image comprising a set of labels, utilizing a pointing device. Moreover, the computer program may comprise a code segment 52 for selecting a portion of the segmented object at which the label is to be positioned, utilizing the pointing device. Furthermore, the computer program may comprise a code segment 53 for labeling the segmented object by utilizing the pointing device to drag the label from the image and drop the label on the portion of the segmented object, resulting in a labeled segmented object.

In an embodiment, the computer-readable medium comprises code segments, which, when the medium is run on an apparatus having computer-processing properties, are arranged for performing all of the method steps defined in one or more embodiments.

In an embodiment, a graphical user interface is provided for performing the method.

In an embodiment the apparatus is comprised in a medical workstation. Applications and use of the above-described embodiments according to the invention are diverse and not limited to only anatomical tree-like structures, such as coronary arteries, carotid arteries, circle of Willis (brain), kidneys, peripherals, pulmonary arteries and veins, but may be applied to any tree-like structure on which labeling is desired.

The labeling method according to some embodiments may be used in all medical products where it is desired that a segmentation result be labeled using some anatomical image information.

The invention may be implemented in any suitable form including hardware, software, firmware or any combination of these. However, preferably, the invention is implemented as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit, or may be physically and functionally distributed between different units and processors.

Although the present invention has been described above with reference to specific embodiments, it is not intended to be limited to the specific form set forth herein. Rather, the invention is limited only by the accompanying claims, and embodiments other than the ones specified above are equally possible within the scope of these appended claims.

In the claims, the term "comprises/comprising" does not exclude the presence of other elements or steps. Furthermore, although individually listed, a plurality of means, elements or method steps may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. A method of labeling a segmented object comprising image data, said method comprising:
   selecting a label in an image including a set of labels, utilizing a pointing device;
   selecting a portion of the segmented object at which the label is to be positioned, utilizing said pointing device;
   labeling the portion of said segmented object with said label, resulting in a labeled segmented object; and
   automatically estimating labels for remaining unlabeled segmented object portions, based on information of said selected label, wherein said image is an anatomical textbook image or an anatomical atlas image of an anatomical structure with the portion of the structure labeled with the set of labels.

2. The method according to claim 1, wherein said labeling is performed by utilizing said pointing device to drag said label from said image and drop said label on said portion of the segmented object.

3. The method according to claim 1, wherein said segmented object is visually presented in a first window of a display.

4. The method according to claim 1, wherein said image is visually presented in a second window of a display.

5. The method according to claim 1, further including:
performing re-segmentation of said labeled segmented object, based on information of said label and said corresponding portion.

6. The method according to claim 5, further including:
comparing the segmented object with the re-segmented object to determine an accuracy of the segmented object, and in response to the segmented object being inaccurate, updating the label in the image with said re-segmented object.

7. The method according to claim 1, further including:
highlighting a label in the labeled segmented object when the corresponding label in the image is selected using said pointing device, or highlighting a label in the image when the corresponding label in the labeled segmented object is selected using said pointing device.

8. A method of updating an image with a labeled segmented object, said method comprising:
selecting a portion of the labeled segmented object, utilizing a pointing device,
selecting a label in an image including a set of labels, utilizing said pointing device,
updating the label in the image with said portion of said segmented object by utilizing said pointing device to drag said portion of the segmented object and drop said portion on said label in said image, resulting in an updated image, and
re-segmenting said labeled segmented object, based on information of said label;
performing automatic labeling of the remaining portions of said segmented object, the automatic labeling includes estimating labels for unlabeled object portions based on the manually selected labels and a labeled anatomical textbook or atlas image.

9. The method according to claim 8, further including:
comparing the segmented object with the re-segmented object to determine an accuracy of the segmented object.

10. The method according to claim 8, wherein the object is resegmented using anatomical text book knowledge about a structure of an anatomical object identified by the label.

11. An apparatus for labeling a segmented object comprising image data, comprising:
a pointing device configured to:
select a label in an image comprising a set of labels; and
select a portion of the segmented object at which the label is to be positioned, and
a unit configured to apply the label to the selected portion of the segmented object and automatically label remaining portions of said segmented object based on said label applied to the selected portion of the segmented object, wherein the unit is further configured to resegment the object using anatomical text book knowledge about a structure of an anatomical object identified by the label.

12. The apparatus according to claim 11, wherein the unit is further configured to: re-segment said labeled segmented object based on information of said label.

13. The apparatus according to claim 12, further including:
comparing the segmented object with the re-segmented object to determine an accuracy of the segmented object, and in response to the segmented object being inaccurate, updating the label in the image with said re-segmented object.

14. The apparatus according to claim 11, wherein the pointing device is further configured to Highlight a label in the labeled segmented object when the corresponding label in the image is selected, or highlighting a label in the image when the corresponding label in the labeled segmented object is selected.

15. An apparatus for updating an image with a labeled segmented object, the apparatus comprising:
a pointing device configured to:
select a label in an image comprising a set of labels; and
select a portion of the segmented object at which the label is to be positioned, and
a unit configured to apply the label to the selected portion of the segmented object with said label and automatically estimating labels for unlabeled object portions of the segmented object based on the manually selected labels and a labeled anatomical textbook or atlas image.

* * * * *